United States Patent [19]

Buonome

[11] 4,454,429
[45] Jun. 12, 1984

[54] METHOD OF CONVERTING OCEAN WAVE ACTION INTO ELECTRICAL ENERGY

[76] Inventor: Frank Buonome, 196 High St., East Haven, Conn. 06512

[21] Appl. No.: 299,053

[22] Filed: Dec. 6, 1982

[51] Int. Cl.³ .................. F03B 13/12; F03B 13/10
[52] U.S. Cl. .................................. 290/53; 290/42; 60/495
[58] Field of Search .................. 290/53, 42; 417/330, 417/332, 331, 333; 405/70, 75, 76, 77, 79; 60/495, 496, 497, 498, 499, 500, 501, 502

[56] References Cited

U.S. PATENT DOCUMENTS

| | | | |
|---|---|---|---|
| 2,848,189 | 8/1958 | Caloia | 290/53 |
| 3,515,889 | 6/1970 | Kammerer | 290/53 |
| 4,281,257 | 7/1981 | Testa et al. | 290/53 X |

FOREIGN PATENT DOCUMENTS

| | | | |
|---|---|---|---|
| 3015810 | 10/1981 | Fed. Rep. of Germany | 290/42 |
| 113059 | 9/1981 | Japan | 290/42 |

*Primary Examiner*—J. V. Truhe
*Assistant Examiner*—Terry Flower
*Attorney, Agent, or Firm*—Walter J. McMurray

[57] ABSTRACT

This invention makes use of the action of ocean waves, converting the water power to electrical energy. This is accomplished by increasing the size of the wave and converting the wave action to hydraulic power, using a turbine and a generator. With this method energy can be stored in tanks (under pressure) and used when needed.

6 Claims, 2 Drawing Figures

METHOD OF CONVERTING OCEAN WAVE ACTION INTO ELECTRICAL ENERGY

BACKGROUND OF THE INVENTION

1. Field of the Invention

The present invention relates to an apparatus for converting the energy available from water motion to electrical energy. More specifically, the energy available from the rise and fall in water level whether caused by waves or waves and tidal changes is converted to and stored as hydraulic energy. The controlled release of this hydraulic energy is transformed via a turbine-electric generator combination to a continuous source of electrical energy.

2. Prior Art

An apparatus for producing power from water waves is described in U.S. Pat. No. 2,848,189 issued to Caloia Aug. 19, 1958. That apparatus described a series of shore mounted levers to drive a series of piston pumps. That portion of the lever arms which extended seaward were of varying lengths so that while one arm might be in the trough of the wave another arm might be at the crest of the wave. The motion of the waves produces the up and down motion of the levers which drives the piston pump, the output of which drives a fluid motor, the spent fluid from which is stored in a reservoir to be recycled back to the piston pumps.

This invention has several limitations upon which the present invention improves. As the seaward lever arm gets longer and longer, and the float gets farther and farther from the lever fulcrum post, unless the piston pump is moved a similar distance away from the fulcrum point, the pumping action is progressively decreased for a given size wave. Therefore, to produce any degree of efficient pumping this apparatus is limited to use near seawalls, cliffs, etc. Again because of the inefficiency of the lever action substantial waves would be required to produce effective pumping action. This conclusion is contrary to the teaching of the inventor at lines 40–42 of the patent.

The present invention overcomes this limitation by using short lever arms which are all the same length. Therefore, the pumping efficiency as measured by the ratio of the distance the piston moves in and out to the distance the float moves up and down is the same for each arm. Further, the use of a water motion magnifier to raise the level of the wave and tidal action above its natural level ensures that the present invention will operate with small waves and tidal changes.

A second limitation of the Caloia invention concerns the connection of the lever to the piston rod. In addition to the frictional wear and tear at the connection point, the length of the rectangular slot controls the maximum amplitude the lever arm to which the float is attached can move up and down. The rectangular slot must be long enough to accomodate both mild and stormy seas. The longer the slot, the weaker the connection.

The present invention cures this problem by employing long horizontally mounted piston pumps. By employing a series of pivot points the up and down wave motion is translated essentially friction free to the in and out piston motion with negligible potentially damaging side to side forces. The use of long in length piston pumps means that the piston action can take place in different sections of the cylinder depending on the level of the water.

A third limitation of the Caloia invention is that while the apparatus incorporates an accumulator to smooth the distribution of energy when the pumping action is insufficient to maintain the desired output, no provision is made to release energy when the pumping action is too vigorous. The present invention incorporates with the accumulator and reservoir a dump valve-check valve system which permits excess pressure in the accumulator to be released to the reservoir which is vented to the atmosphere. The Caloia invention uses one accumulator per piston pump. In the present invention, the number of accumulators is independent of the number of piston pumps and depends only on the desired safety period. This is the time period the stored energy must be able to drive the turbine while the piston pump is either inoperable or operating at diminished capacity.

A U.S. Pat. No. 4,281,257 issued to Testa et al on July 28, 1981 describes a wave power generator. In this device, the up and down wave action is converted through levers and pivot points to a horizontal in and out motion by which air is compressed into a tank. The compressed air is then used to drive an air turbine or air grinder.

In a Japanese patent, issued in September 1981, Nakamura describes a compressed air storage device. The compressed air is produced by piston pump driven by the up and down motion of waves. Klein in German Patent Document dated October 1981, describes a reservoir-accumulator hydraulic system which is pressurized by the action of waves impinging on the walls of a cell.

Kammerer in U.S. Pat. No. 3,5125,889 issued on June 2, 1970 describes a power generation apparatus for use with offshore oil rigs which converts wave action into electrical energy. The energy conversion means utilized hydraulic pumps, hydraulic motors and an electrical accumulator such as batteries.

SUMMARY OF THE INVENTION

A principal object of the present invention is to provide a low cost apparatus for producing electrical energy from water action. The low cost objective applies to both construction, maintenance and operation of the apparatus. Another object of the present invention is to produce the electrical energy with an apparatus which minimizes pollution of the environment. Pollution of the environment is a major by-product of the production of electrical energy from the combustion of fossil fuels. Another object of the present invention is to produce electrical energy from not only medium to large waves but also from very small waves which accompany tidal ebb and flow.

The invention comprises a series of floats positioned between concrete wave magnifiers. A float is attached through a series of shafts to a piston. The up and down action of the float produces a pumping action in a hydraulic cylinder. The pressure build up from the pumping action is stored in a series of accumulator tanks. The pressure buildup can be released in a controlled fashion to drive a turbine-electric generator combination. The hydraulic fluid from the turbine and any excess in the accumulator tanks are transferred to a series of reservoir tanks which supply the piston with renewed hydraulic fluid.

DETAILED DESCRIPTION OF THE INVENTION

Figure 1:
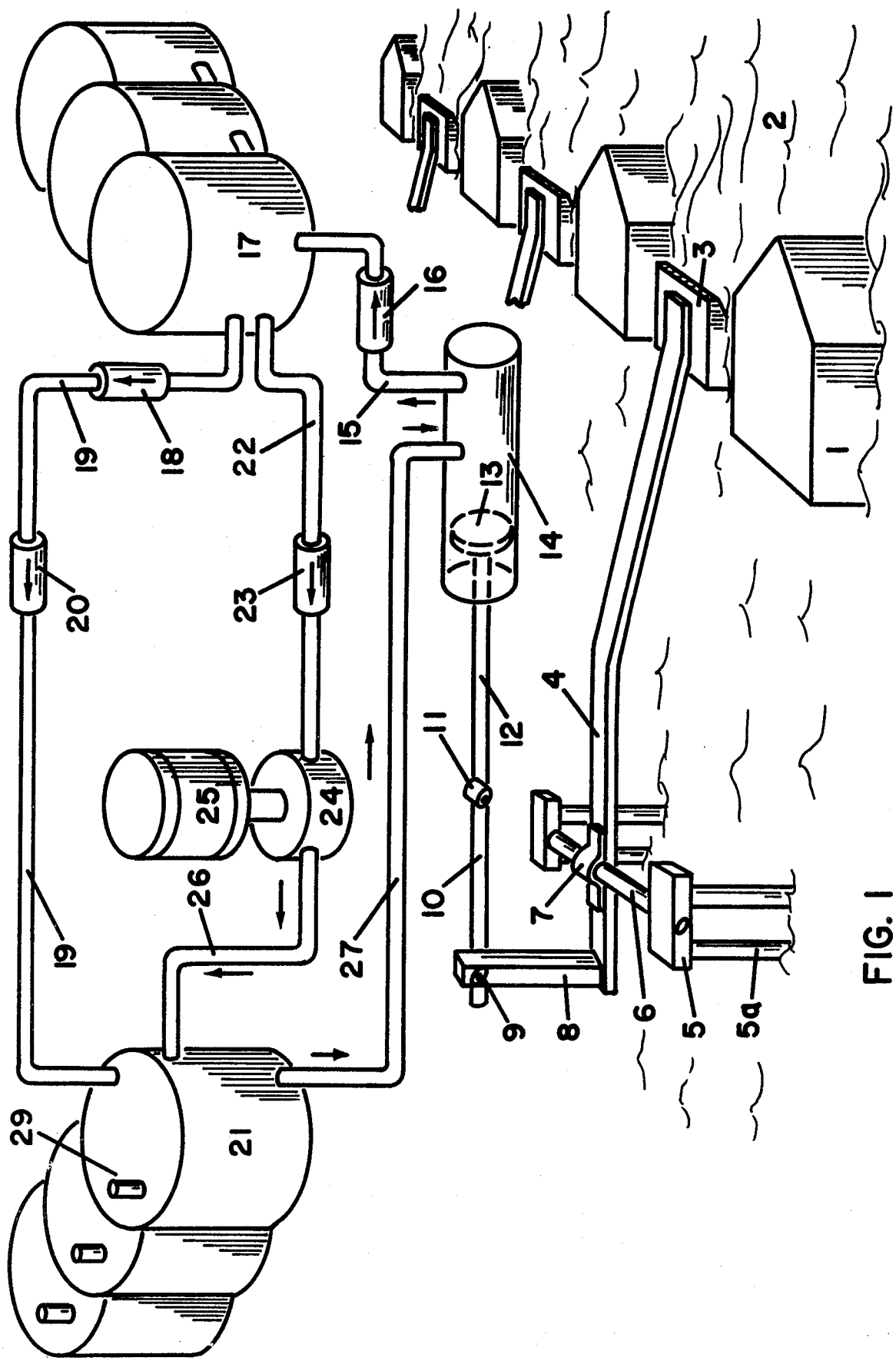
FIG. 1 a side view of the apparatus for converting water action into electrical energy showing the components of the apparatus.
Figure 2:
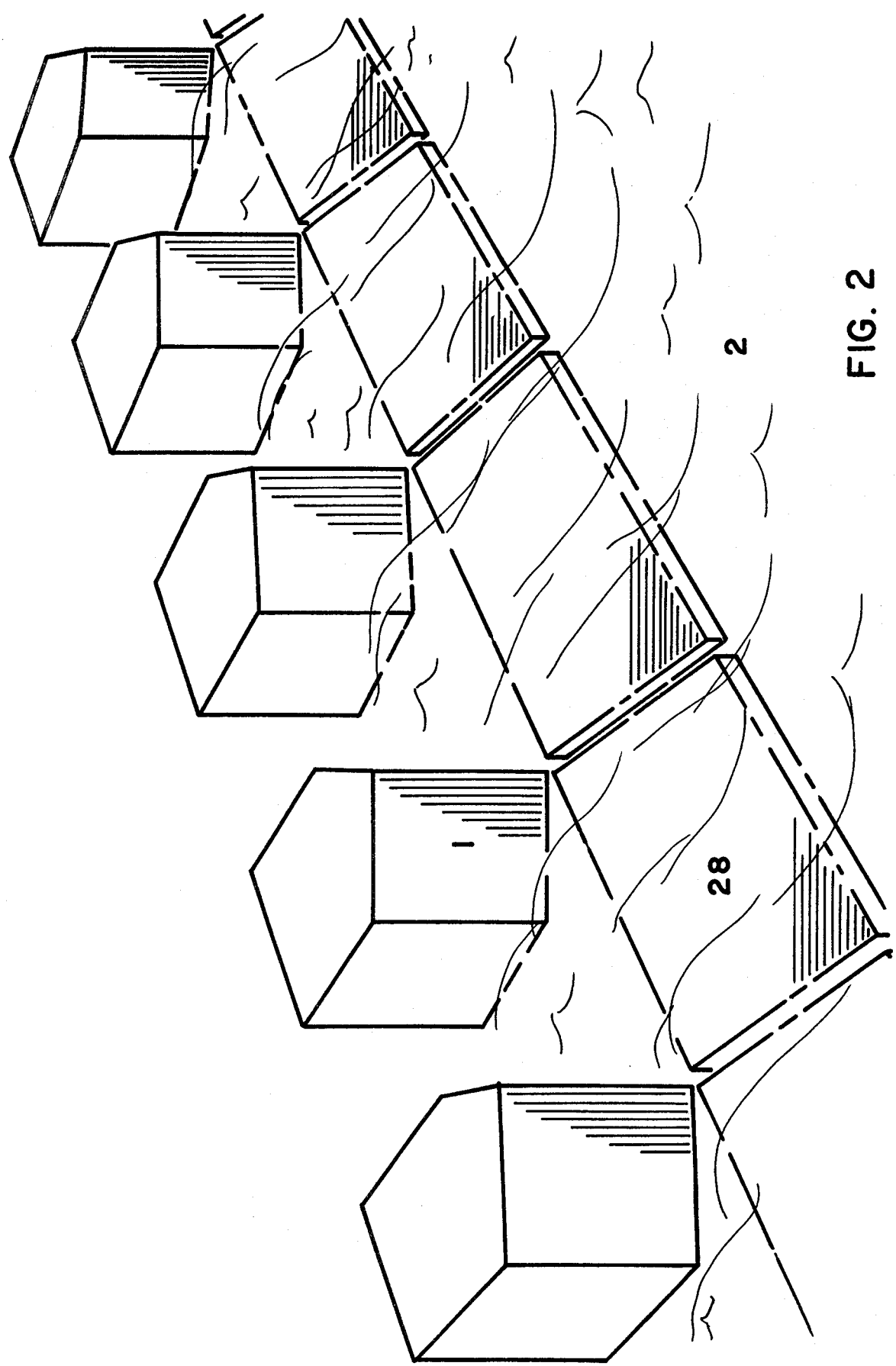
FIG. 2 is a detailed view of the water action magnifier.

Referring now to the drawings in greater detail in which like numbers indicate like parts throughout the several views, the apparatus comprises two or more parallel vertical pillars 1 constructed with vertical knife-edges with the knife-edges directed toward the inflowing water. A series of slabs 28 horizontally tapered are placed in front of and between the vertical knife-edge pillars such that the taper is down and away from the vertical knife-edge pillars. A series of floats 3 are positioned between the knife-edge pillars and behind the tapered slabs.

The connecting means from the float to a piston 13 includes an activating arm 4, a post 8 which is mounted perpendicular at the opposite end of the actuating arm from the float. At pivot point means 9, the post is connected to shaft 10 which is connected to piston rod 12 by pivot point means 11. The piston rod is connected to the piston in the long horizontally mounted hydraulic cylinder 14. This connecting means converts a vertical up and down action of the float produced by the water motion to a horizontal in and out movement with a minimal loss of energy from friction.

A bracket 5 may be mounted onshore or offshore on pilings 5a. The bracket holds a shaft 6 on which the connecting means is supported by bearing 7.

In operation, when a water motion 2 strikes the vertical knife-edge pillars, the water motion is channeled between the knife-edge pillars, producing a higher water level than with an undiverted wave. When the wave clears the knife-edge pillar, the water level returns to its natural level. Thus, the up and down motion of the float is increased which translates into an identical increase in the movement of the piston and an increase in energy transfer per wave. The horizontally tapered slabs enhance the action of small waves and the ebb and flow of water with tidal changes by forcing the water to a higher than natural level and consequently raising the float above its natural position which translates into an increase in the movement of the piston.

In operation, multiple sets of floats, vertical knife-edge pillars, connecting means from float to piston, and cylinders are employed. One advantage of this apparatus is that the actuating arms in the connecting means are typically of one size but these actuating arms could be of varying sizes if the terrain where the apparatus is mounted dictated. It is expected that in the best mode of operation, the pilings would be located some distance from shore in which case the actuating arms would be of uniform size. Therefore, the hydraulic fluid transferred is the accumulation of multiple pumps.

The hydraulic fluid displaced by the movement of the piston is transferred via pressure line 15 and check valve 16 to a series of accumulator storage tanks 17 where air and oil are stored under pressure. The size of the accumulator tanks and the number is a function of the pressure demand on the system and on the time period the demand must be met when the water action is insufficient to meet the demand or the pumping action is incapacitated e.g., during a hurricane.

The pressurized hydraulic fluid in the accumulator tanks is connected to turbine 24 via a pressure line 22 and pressure regulating or flow regulating valves 23 which control the speed of the turbine. The turbine drives the electric generator 25. The hydraulic fluid is transferred from the turbine to a reservoir tank 21 with vent 29 via return line 26. Excess hydraulic pressure or hydraulic fluid in the accumulator tanks is vented to the reservoir tanks via return dump line 19, metering valve 18 and return line check valve 20. The hydraulic fluid stored in the reservoir is fed back to the cylinder via feed line 27.

I claim:

1. An apparatus for converting water motion to electrical energy, which comprises:
   (a) a water motion magnifier means;
   (b) a float responsive to water motion whose reciprocating up and down movement is converted by a connecting means to a horizontal in and out movement which drives a piston in a long horizontally mounted cylinder;
   (c) an accumulator means connected to a reservoir means by two pathways, by a metering valve, a check valve and a return line and by a regulator valve, a turbine and a hydraulic pressure line;
   (d) means to convert the turbine output to electrical energy.

2. The apparatus of claim 1 wherein the water motion magnifier means comprises parallel, vertical, seaward-facing knife-edged pillars.

3. The apparatus of claim 2 wherein the water motion magnifier means comprises a horizontally tapered down seaward slab positioned in front of the parallel, vertical, seaward-facing knife-edged pillars.

4. The apparatus of claim 1 wherein the connecting means comprises a perpendicular post mounted at the opposite end to the float to an actuating arm, the said post connected at a pivot point to a shaft, the said shaft connected to the piston by a second pivot point.

5. The apparatus of claim 2 wherein the connecting means comprises a perpendicular post mount at the opposite end to the float to an actuating arm, the said post connected at a pivot point to a shaft, the said shaft connected to the piston by a second pivot point.

6. The apparatus of claim 3 wherein the connecting means comprises a perpendicular post mounted at the opposite end to the float to an actuating arm, the said post connected at a pivot point to a shaft, the said shaft connected to the piston by a second pivot point.

* * * * *